Sept. 18, 1945.   J. LIPANI   2,385,010
DUPLEX REVERSIBLE TOOL HOLDER
Filed Aug. 30, 1943   2 Sheets-Sheet 1
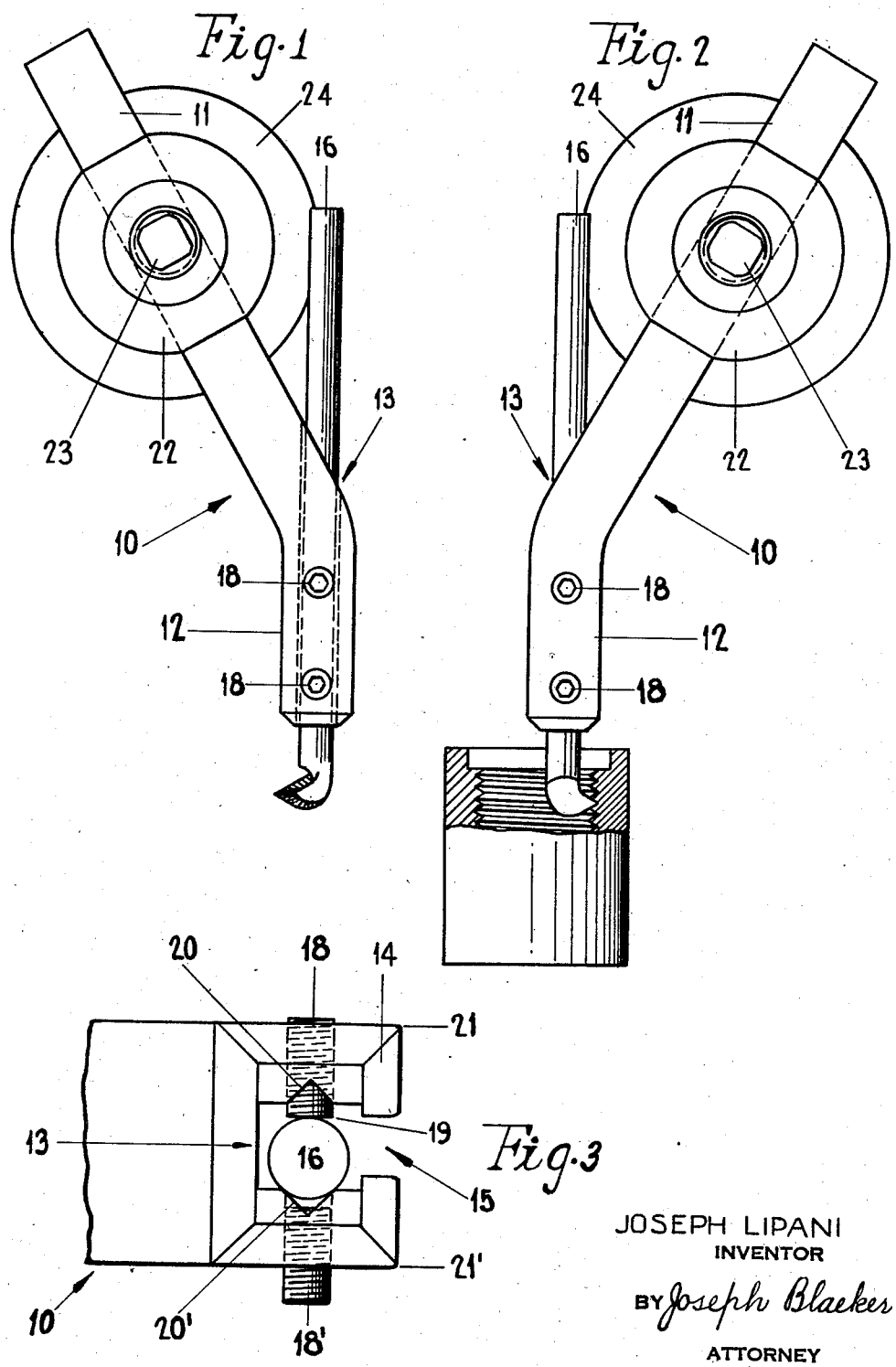
JOSEPH LIPANI
INVENTOR
BY Joseph Blacker
ATTORNEY Sept. 18, 1945.   J. LIPANI   2,385,010
DUPLEX REVERSIBLE TOOL HOLDER
Filed Aug. 30, 1943   2 Sheets-Sheet 2
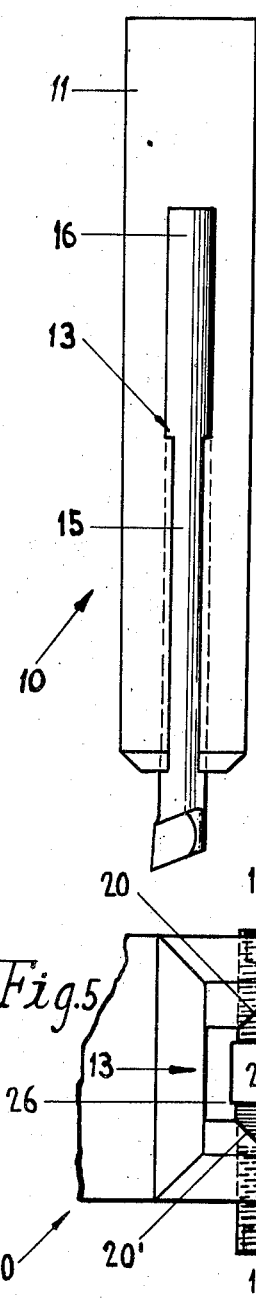
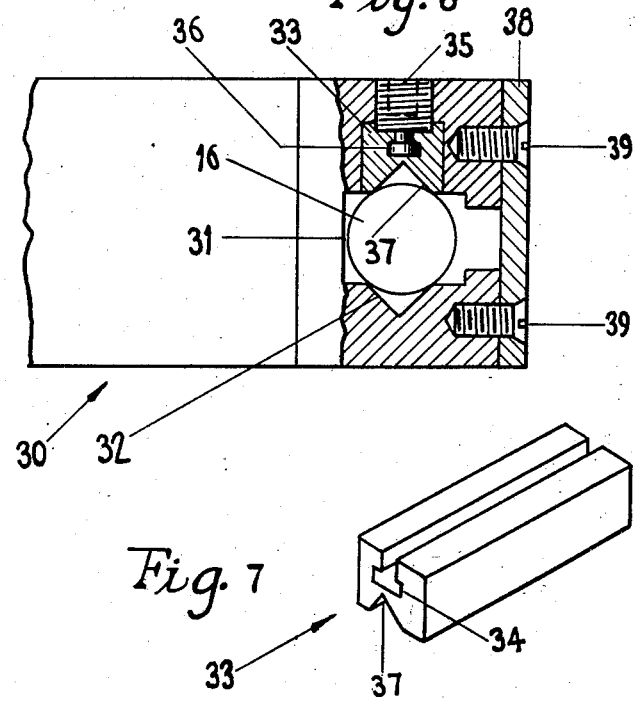
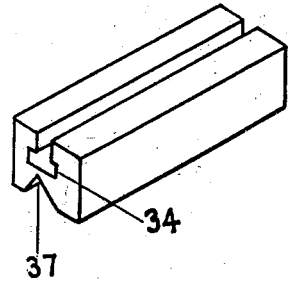
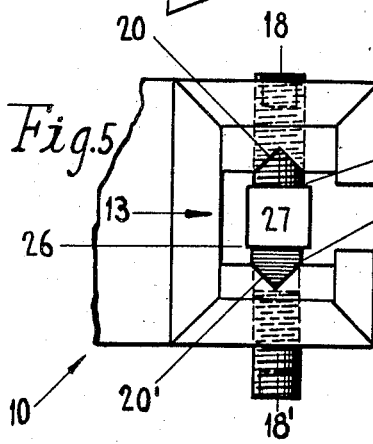
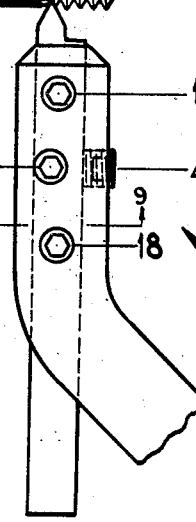
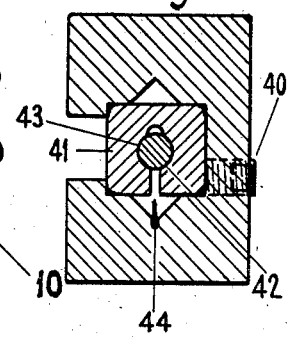
JOSEPH LIPANI
INVENTOR
BY *Joseph Blacker*
ATTORNEY Patented Sept. 18, 1945

2,385,010

UNITED STATES PATENT OFFICE 2,385,010

DUPLEX REVERSIBLE TOOLHOLDER

Joseph Lipani, Brooklyn, N. Y.

Application August 30, 1943, Serial No. 500,722

5 Claims. (Cl. 29—98)

This invention relates to a right-hand and left-hand reversible tool holder for use in lathes, planers, shapers, etc., and an object of this invention is to provide a tool holding device which is adapted to support boring bars used in such machines and having screws threaded in the upper and lower walls of the tool holder and passing through V-shaped grooves in the said upper and lower walls, the ends of the screws in engagement with a boring bar being flat and adapted to clamp the boring bar along a plurality of points positioned in linear alinement with the said tool and whereby the boring bar is in contacting relation with one of the grooves all along the entire length of the groove in all cutting adjustments of the boring bar.

An object of this invention is to provide a right-hand and left-hand reversible tool holder for machine tool boring bars, comprising an angularly shaped bar of uniform rectangular cross-section and having a through slot in one lengthwise side of the bar, the upper and lower walls defining the slot having alined V-shaped superposed grooves facing each other and having separate clamping means in each of said upper and lower walls, whereby the bar may be reset from right-hand to left-hand positions without disturbing the horizontal setting of the tool post.

Another object of this invention is to provide a relief slot in the tool holding slot whereby the tool holding slot may be easily cleaned of dirt with a brush, etc. inserted sideways into the tool holding slot, the said relief slot serving also for the removal of broken tool bits without disturbing the setting of the tool holder in the tool post.

Another object of this invention is to aline the superposed V-shaped grooves in the upper and lower faces of the tool holding slot so that a boring bar of circular cross-section may be seated in linear alinement with both grooves, and to provide means for clamping the boring bar or other cutting tool in the tool holder in right-hand or left-hand positions, whereby a single tool holder is adapted to be used for all cutting positions and operations such as straight turning, thread cutting and internal boring.

This application is a continuation-in-part of my patent application for Quick-setting duplex tool holder, Serial No. 468,315, filed December 7, 1942, now Patent No. 2,333,021, issued October 26, 1943.

With the above and other objects in view, the invention will be hereinafter more particularly described and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a right-hand top plan view of the tool holder.

Figure 2 is a left-hand top plan view of the tool holder, in position for cutting an internal thread.

Figure 3 is a fragmentary portion of the tool holder, on an enlarged scale.

Figure 4 is a side elevation of the tool holder shown in Figures 1 to 3 inclusive.

Figure 5 is a fragmentary portion of the tool holder, on an enlarged scale, and showing a means for supporting a square cutting tool therein.

Figure 6 is an end view of a fragmentary portion of a modified tool holder on an enlarged scale, showing means for clamping a boring bar in the tool holder, the head of the tool holder being broken away to show the clamping means.

Figure 7 is a perspective view of the clamping means shown in Figure 6.

Figure 8 is a top plan view of a fragmentary portion of the tool holder shown in Figure 1, showing a thread cutting tool supported therein.

Figure 9 is a cross-sectional view of the tool holder shown in Figure 8, on an enlarged scale, with the cutting tool omitted and showing a boring bar chuck in place of the cutting tool.

In the illustrated embodiment of the invention, the numeral 10 indicates a tool holder comprising a shank 11, of rectangular cross-section and preferably bent in angular form to provide an angular shank extension 12.

As best shown in Figure 4, the angular extension 12 has a through slot 13. One of the vertical sides 14 defining the slot 13 has a relief slot 15 extending from end to end of the slot 13.

As shown in Figures 1 to 4 inclusive, the slot 13 is adapted to receive a boring bar 16, preferably extending outwardly at both ends of the slot. Socket head screws 18 threaded into the upper portion of the tool holder 10 are adapted to move vertically into the slot 13. The screws 18 have flat lower ends 19.

Under operating conditions it is necessary to very thoroughly clean the slot 13 so that the cutting tools will seat squarely, and for this purpose the relief slot 15 permits a brush to be inserted sideways into the slot 13. The relief slot 15 also serves for quickly removing broken tool bits from the slot 13, without disturbing the tool post.

The upper and lower faces defining the slot 13 have V-shaped grooves 20, 20' lengthwise thereof. The grooves are in superposed alinement and arranged to selectively receive and support the boring bar 16 in the tool holder 10. Socket head screws 18', threaded in the lower portion of the tool holder 10, are adapted to move vertically downwardly from the slot 13. The screws 18, 18' selectively serve to clamp the boring bar 16 in operative positions in the grooves 20, 21'.

Figures 1 and 2 show the tool holder 10 in reverse positions for supporting a cutting tool 16 in right-hand and left-hand cutting positions and selectively wedged in operating positions between the inclined walls of the V-shaped grooves 20, 20'.

It will be noted that in both Figures 1 and 2, the shank and the cutting portion of the cutting tool is horizontally positioned and that the center line of the shank is equally distant from the lower horizontal face of the tool holder, whichever face 21, or 21' lies in the lower horizontal plane.

In either position, there is a direct thrust of a plurality of screws 18 or 18' against the cutting tool which is firmly pressed against two angularly positioned planes all along the length of the V-shaped grooves 20 or 20'. A wedging action takes place which locks the cutting tool in the tool holder with a plural grip.

In Figures 1 and 2, the tool holder 10 is held in right-hand or left-hand position in a tool post 22 by a bolt 23. It is to be noted that a parallel block or shim is placed under the tool holder 10 when the cutting face of the tool bit 16 is at a lesser elevation in the reversed position of the tool bit and it is necessary to cut with the work piece rotating up to the bit instead of down to the bit, to prevent chattering. The tool post structure and the supporting ring 24 of the tool post 22 are well known in the machine art and need no further description.

As shown in Figure 5, there is provided a key 25 of triangular cross-section and designed to fit into either of the V-shaped grooves 20, 20' to provide a horizontal top surface 26 on which a cutting tool 27 of square cross-section may be supported. The V-shaped grooves of the tool holder 10 may thus be used with cutting tools of square cross-section by grinding down one of their ends suitable for boring or thread-cutting, etc. The square cross-section cutting tools are also clamped down by the screws 18, 18'.

As shown in Figure 6, there is provided a modified tool holder 30 having a through slot 31, similar to the slot 13 in the tool holder 10. One horizontal face defining the slot 31 has a V-shaped groove 32 lengthwise thereof, similar to the V-shaped grooves in the tool holder 10.

For the purpose of clamping a tool bit or boring bar 16 along an extended length thereof there is provided a key 33 vertically movably mounted in the upper portion of the tool holder 30 opposite the groove 32.

As best shown in Figure 7, the key 33 has a T-shaped slot 34 extending throughout its length. A screw 35 having a T-shaped extension 36 at its lower end is adapted to enter into the slot 34. The portion of the key 33 opposite the slot 31 has a V-shaped groove 37 centrally thereof and extending throughout its length. The grooves 32 and 37 are in alinement.

It will thus be seen that the tool holder 30 may be used for clamping a boring bar 16 by lowering the key 33 so that the side walls of the V-shaped groove 37 wedge the boring bar against the opposite V-shaped groove 32. The bar 16 is thus clamped with a double grip.

For the purpose of reinforcing the slotted lipped portion of the tool holder 30 when used for very heavy cutting, I provide a bar 38 fixed to the said slotted portion by screws 39. It is to be noted that the bar 38 is preferably of rectangular cross-section and is only slightly larger along its width than its thickness so that as little as possible of the length of the slot 31 is obstructed. This permits a brush to be inserted into the slot for cleaning it.

It is to be noted that with the embodiment shown in Figure 6, a boring bar may be positively clamped at the top as well as at the bottom along a very long distance and very tightly in the tool holder to prevent chattering. This positive up-and-down clamping on a long distance of the cutting tool is particularly of advantage when machining heavy work.

It is to be noted that, while I have shown a single slot in one of the sides of the tool holder, that I may incorporate a slot in each lengthwise side, the slots being at an acute angle to each other, one of these slots being in the longer side of the tool holder and used for planer and shaper work.

It is also to be noted that the V-shaped grooves are adapted to support boring bars of various diameters, as small as one-eighth of an inch in diameter, for boring holes of very small diameter. For the purpose of centrally supporting boring bars of small diameter in the tool holder, I provide split chuck blocks 41, each having a hole 42 adapted to receive the particular small size boring bar desired. The boring bar 43 is held fixed in the chuck 41 by a screw 40 exerting a sideways pressure tending to close a slot 44 in the chuck 41.

The tool holders herein shown will hold either angular or round-shank tool bits with absolute rigidity under the severest strains of use.

It is to be noted that the cutting tools and the tool holders shown herewith are always in horizontal position, which is especially of advantage when cutting threads. A desirable advantage of the tool holders herewith shown is that they permit placing the cutting tools very close to the face plate; also to place the cutting tool in close relation with the work piece and with the center of a lathe.

In accordance with the patent statutes I have described and illustrated the preferred embodiments of my invention, but it will be understood that various changes and modifications can be made therein without departing from the spirit of the invention as defined by the appended claims.

I claim:

1. In a quick-setting right hand and left hand reversible tool holder, comprising an angularly shaped bar of uniform rectangular cross-section, a through slot in one lengthwise side of said tool holder, the upper and lower faces defining said slot having V-shaped grooves lengthwise thereof and adapted for adjustably supporting a boring bar of circular cross-section selectively in either groove, said grooves being parallel with the upper and lower faces of said bar and adapted for setting a boring bar parallel with said faces, said grooves being superposed and in alinement with each other, screws threaded in the upper and lower walls of said bar and passing through the apices of said V-shaped grooves, the ends of the screws in engagement with said boring bar being flat and adapted to clamp said boring bar along a plurality of points positioned in linear alinement, said grooves being of extensive length and said boring bar being in contacting relation with one of said grooves all along the entire length of said groove in all of said adjustments.

2. In a quick-setting right hand and left hand reversible tool holder, comprising an angularly shaped bar of uniform rectangular cross-section, a through slot in one lengthwise side of said bar, the upper and lower walls defining said slot having V-shaped grooves lengthwise thereof and adapted for adjustably supporting a boring bar of circular cross-section selectively in either groove, said slot being defined by oppositely facing lips at one vertical face of said tool holder, said grooves being parallel with the upper and lower faces of said bar and adapted for supporting a boring bar parallel with said faces, said grooves being superposed and in alinement with each other, screws threaded in the upper and lower walls of said bar and passing through the apices of said V-shaped grooves, the ends of the screws in engagement with said boring bar being flat and adapted to clamp said boring bar along a plurality of points positioned in linear alinement, said grooves being of extensive length and said boring bar being in contacting relation with one of said grooves all along the entire length of said groove in all of said adjustments.

3. In a quick-setting right hand and left hand reversible tool holder, comprising an angularly shaped bar of uniform rectangular cross-section, a through slot in one lengthwise side of said bar, the upper and lower walls defining said slot having V-shaped grooves lengthwise thereof and adapted for adjustably supporting a boring bar of circular cross-section selectively in either groove, said slot being defined by oppositely facing lips at one vertical face of said tool holder, said grooves being parallel with the upper and lower faces of said bar and adapted for supporting a boring bar parallel with said faces and horizontally in a tool post, said grooves being superposed and in alinement with each other, screws threaded in the upper and lower walls of said bar and passing through the apices of said V-shaped grooves, the ends of the screws in engagement with said boring bar being flat and adapted to clamp said boring bar along a plurality of points positioned in linear alinement, whereby said boring bar may be reset in said tool post from right-hand to left-hand positions without disturbing the horizontal setting of said tool post.

4. In a quick-setting tool-holder, comprising an angularly shaped bar of rectangular cross-section, a through slot in one lengthwise side of said bar, at least one wall defining said slot having a V-shaped groove lengthwise thereof and adapted for adjustably supporting a cutting bar in said groove, said slot being defined by oppositely facing lips at one vertical face of said tool holder, said groove being parallel with at least one wall, screws threaded in said bar, the ends of the screws in engagement with said bar being flat and adapted to clamp said boring bar along a plurality of points, said groove being of extensive length and said bar being in contacting relation with said groove all along the entire length of said groove in all of said adjustments.

5. In a quick-setting right hand and left hand reversible tool holder, comprising an angularly shaped tool holder of rectangular cross-section, a through slot in one lengthwise side of said tool holder, the upper and lower walls defining said slot having V-shaped grooves lengthwise thereof and adapted for adjustably supporting a boring bar of circular cross-section, said slot being defined by oppositely facing lips at one vertical face of said tool holder, said grooves being parallel with the upper and lower faces of said tool holder and adapted for supporting a boring bar parallel with said faces, said grooves being superposed and in alinement with each other, screws threaded in said tool holder, the screws in engagement with said boring bar being adapted to clamp said boring bar along a plurality of points, said grooves being of extensive length and said boring bar being in contacting relation with said grooves all along the entire length of said grooves in all of said adjustments, said tool holder being adapted to clamp said boring bar with a double grip.

JOSEPH LIPANI.